(12) United States Patent
Harrison et al.

(10) Patent No.: US 9,291,773 B2
(45) Date of Patent: Mar. 22, 2016

(54) STRIPPING APPARATUS AND METHODS FOR TIGHT-BUFFERED OPTICAL FIBERS

(71) Applicant: Corning Cable Systems LLC, Hickory, NC (US)

(72) Inventors: Carl Randall Harrison, Decatur, TX (US); Gregory Earl McMinn, Watauga, TX (US); Brett Allen Menke, Haslet, TX (US); Chanh Cuong Vo, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 297 days.

(21) Appl. No.: 14/052,982

(22) Filed: Oct. 14, 2013

(65) Prior Publication Data

US 2014/0245875 A1  Sep. 4, 2014

Related U.S. Application Data

(60) Provisional application No. 61/714,443, filed on Oct. 16, 2012.

(51) Int. Cl.
*G02B 6/24* (2006.01)
*G02B 6/245* (2006.01)

(52) U.S. Cl.
CPC . *G02B 6/245* (2013.01); *Y10T 83/02* (2015.04)

(58) Field of Classification Search
CPC ........... G02B 6/24; G02B 6/245; Y10T 83/02
USPC ............... 385/134–138, 147; 83/861; 30/90.1
See application file for complete search history.

(56) References Cited

U.S. PATENT DOCUMENTS

| RE30,342 | E | 7/1980 | Perrino | 81/9.5 B |
|---|---|---|---|---|
| 4,271,729 | A | 6/1981 | Perrino et al. | 81/9.5 B |
| 4,315,444 | A | 2/1982 | Perrino et al. | 76/101 R |
| 4,850,108 | A | 7/1989 | Perrino et al. | 30/90.4 |
| 5,062,192 | A | 11/1991 | Sawyer et al. | 29/426.4 |
| 6,308,417 | B1 | 10/2001 | Ducret | 30/90.7 |
| 6,549,712 | B2 * | 4/2003 | Abe | G02B 6/02123 385/123 |
| 6,662,450 | B1 | 12/2003 | Ducret | 30/90.4 |

FOREIGN PATENT DOCUMENTS

| EP | 2249188 A1 | 11/2010 | G02B 6/245 |
|---|---|---|---|
| WO | WO2006/130572 A2 | 12/2006 | |

OTHER PUBLICATIONS

Luminos Industries Ltd., Luminos SCS1 Soft Contact Acrylate Stripper, 1996-2013, located via Internet Search Oct. 9, 2013, 1 page.
Micro Electronics, Inc., Micro-Strip Stripping Procedures, located via Internet Search Oct. 9, 2013, 2 pages.
Ripley, Wire & Cable Preparation Tools for Fiber Optic, Electrical, Telecommunications and Electronics, 1996-2012, located via Internet Search Oct. 9, 2013, 2 pages.

* cited by examiner

*Primary Examiner* — Akm Enayet Ullah

(57) ABSTRACT

Apparatus and methods for stripping tight-buffered optical fibers are disclosed. The methods include removing a portion of the buffer layer and thin-coating layer to expose the bare fiber at the optical fiber end, wherein the cuts to the optical fiber needed to strip the optical fiber are made simultaneously. In some methods, a portion of the cover is used to clean the bare fiber as the cover portion is removed. In other methods, the normal force that secures the cover is alleviated so that the cover portion can be removed without breaking the bare fiber. Different apparatus configured to effectuate the stripping methods are disclosed.

13 Claims, 16 Drawing Sheets

STRIPPING APPARATUS AND METHODS FOR TIGHT-BUFFERED OPTICAL FIBERS

CROSS-REFERENCE TO RELATED APPLICATIONS

This application claims the benefit of priority under 35 U.S.C. §119 of U.S. Provisional Application Ser. No. 61/714,443, filed on Oct. 16, 2012, the content of which application is relied upon and incorporated herein by reference in its entirety.

FIELD

The present disclosure relates to stripping of optical fibers, and in particular to apparatus and methods for stripping a tight-buffered optical fiber.

BACKGROUND

Certain types of optical fibers have a buffer layer that resides immediately adjacent either the bare glass or adjacent a thin coating layer that is immediately adjacent the bare glass. A tight buffer is one that is in immediate (i.e., intimate) contact with the coating layer or the glass fiber. A typical material for the tight buffer is a polymer, which can be applied during the fiber manufacturing process. An example tight-buffered optical fiber has a core diameter that can be about 8 µm for a single-mode fiber and 50 µm or 62.5 µm for a multimode fiber. The cladding that immediately surrounds the core has an (outer) diameter of 125 µm, the coating layer that immediately surrounds the cladding has an (outer) diameter of 250 µm. The buffer layer that immediately surrounds the coating layer has an outer diameter of nominally 900 µm that defines the diameter of the optical fiber. The coating and buffer define a cover for the glass fiber.

Tight-buffered optical fibers find use in a number of optical fiber systems, including telecommunications systems, where the fiber can be pigtailed by connectorizing the fiber end. The pigtailed optical fiber can be used for a variety of active and passive applications. The 900 µm outer diameter is an industry-standard size for the optical fiber.

In order to connectorize a tight-buffered optical fiber, the end of the fiber must be properly prepared. This typically includes stripping off an end-portion of the buffer layer to expose the coating layer. Then, an end-portion of the coating layer is stripped to expose an end-portion of the bare glass fiber. The bare glass fiber then must be cleaned before the bare glass fiber is interfaced with the connector. The overall length of the bare glass fiber portion must then be cut to have a select length for the given connector.

The above multiple steps are typically performed manually and in the field by a technician. Even with using certain types of known stripping tools, these stripping steps are time-consuming and labor-intensive and can lead to imperfections as well as breakage. Moreover, conventional stripping tools are limited in their capability and can only strip a tightly buffered fiber to expose about 20 mm of glass fiber. This is generally because the normal (i.e., radially inward) forces of the cover against the glass fiber limit the amount of axial force that can be applied to the cover to remove a larger section of the cover from the glass fiber.

SUMMARY

Apparatus and methods for stripping tight-buffered optical fibers are disclosed. The methods include removing a portion of the buffer layer and thin-coating layer to expose the bare fiber at the optical fiber end, wherein the cuts to the optical fiber needed to strip the optical fiber are made simultaneously. In some methods, a portion of the cover is used to clean the bare fiber as the cover portion is removed. In other methods, the normal force that secures the cover is alleviated for a portion of the cover so that the cover portion can be removed without breaking the bare fiber. Different apparatus configured to effectuate the stripping methods are disclosed.

An aspect of the disclosure is a method of stripping a buffered fiber having an end, a central glass fiber, and a cover having a coating layer that surrounds the glass fiber and a buffer layer that surrounds the coating layer. The method includes: a) making a first cut at a first position of the buffered fiber and down through the cover to the glass fiber to define a removable cover section; b) making a second cut at a second position of the buffered fiber between the first position and the fiber end, the second cut extending into the cover to about the coating layer; and c) sliding the removable cover section from the glass fiber to define an exposed glass fiber section.

Another aspect of the disclosure is the method described above, and further including cutting the cover through the buffered fiber near the end to define a new end.

Another aspect of the disclosure is the method described above, wherein the first cut is a circumferential cut.

Another aspect of the disclosure is the method described above, wherein the second cut is an angled cut.

Another aspect of the disclosure is the method described above, wherein the exposed glass fiber section has a length between 35 mm and 45 mm.

Another aspect of the disclosure is the method described above, wherein the fiber end and the second position are separated by a distance d1 in the range from 25 mm to 30 mm.

Another aspect of the disclosure is the method described above, wherein the first and second positions are separated by a distance d2 in the range from 10 mm to 15 mm.

Another aspect of the disclosure is the method described above, including performing acts a) through c) simultaneously.

Another aspect of the disclosure is the method described above, further comprising cutting through the buffered fiber near the end to define a new end, wherein said cutting through the buffered fiber is performed simultaneously with acts a) through c).

Another aspect of the disclosure is the method described above, wherein the second cut is a circumferential cut.

Another aspect of the disclosure is the method described above, and further comprising: prior to performing the first cut, performing the second cut to define a first movable cover sub-section between the second position and the end, and to define a fixed cover section; and axially sliding the first movable cover sub-section away from the fixed cover section. The first cut is performed in the fixed cover section after the second cut to define a second movable cover sub-section between the second position and first position, and the first and second movable cover sub-sections define the removable cover section that is slid from the glass fiber.

In some embodiments, axially sliding the first movable cover sub-section away from the fixed cover section further comprises exposing a portion of the coating layer that defines a third movable cover sub-section between the first movable cover sub-section and the fixed cover section. The first, second, and third movable cover sub-sections define the removable cover section.

In other embodiments, the second cut also extends through the coating layer down to the glass fiber such that axially sliding the first movable cover sub-section away from the fixed cover section further comprises exposing a portion of the glass fiber between the first movable cover sub-section and the fixed cover section.

Another aspect of the disclosure is the method described above, wherein at least one of the cuts of the buffered optical fiber is performed by: disposing the buffered optical fiber between first and second aligned semicircular cutting portions of first and second blade members having respective first and second front surfaces and first and second confronting edges, with the first and second semicircular cutting portions defining a circular opening having a central axis when the first and second blade members are closed; and pushing the buffered optical fiber into a fiber support feature on the first blade member with an insertion member on the second blade member while closing the first and second blade members to cause the buffered optical fiber to be centered on the central axis when the first and second blade members are closed.

Another aspect of the disclosure is a stripping device for stripping a buffered fiber having an end, a central glass fiber, and a cover having a coating layer that surrounds the glass fiber and a buffer layer that surrounds the coating layer. The device includes: a) means for making a first cut at a first position in the cover of the buffered fiber and down to the glass fiber to define a removable cover section; b) means for making a second cut in the cover of the buffered fiber at a second position between the first position and the fiber end, the second cut being down to about the coating layer to facilitate removing the removable cover section from the glass fiber; and c) means for sliding the removable cover section from the glass fiber to define an exposed glass fiber section.

Another aspect of the disclosure is the device described above, wherein at least one of the means for making the first cut and the means for making the second cut includes first and second blade members having respective first and second front surfaces and first and second confronting edges, with the first and second confronting edges having first and second aligned semicircular cutting portions that form a circular opening having a central axis when the first and second blade members are closed.

Another aspect of the disclosure is the device described above, and further comprising: a fiber support feature on the first front surface sized to accommodate and support the buffered optical fiber within the first semicircular cutting portion.

Another aspect of the disclosure is the device described above, and further comprising: an insertion member on the second front surface adjacent the second semicircular cutting portion and configured to urge the buffered optical fiber into the fiber support feature when the first and second blade members are closed to circumferentially cut the buffered optical fiber to maintain the buffered fiber centered on the central axis.

Another aspect of the disclosure is the device described above, and further comprising: a housing having an input end into which the buffered fiber can be inserted, a terminal end that limits the insertion, the housing comprising front and rear housing sections, wherein the rear housing section has a longitudinal axis along which is arranged at least one fiber support feature to support the buffered fiber.

Another aspect of the disclosure is the device described above, and further comprising: top and bottom movable handles operably supported by rear housing section so that they can be squeezed to move towards each other, the top and bottom handles defining input-end and terminal-end blades, with the top handle having an angled blade between the input-end and terminal-end blades; and wherein, when the top and bottom movable handles are squeezed, the following occurs simultaneously: a) the terminal-end blades cut through the buffered fiber; b) the angled blade makes an angled cut of a top portion of the buffered fiber through the buffer layer to the coating layer; and c) the input-end blades make a circumferential cut through the buffer and coating layers to the glass fiber, thereby defining a removable cover section.

Another aspect of the disclosure is the device described above, wherein the input-end blades are adapted to hold the removable cover section within the housing when the buffered fiber is pulled from the housing, thereby leaving the buffered fiber with an exposed glass fiber section having length that is between 35 mm and 45 mm.

Another aspect of the disclosure is the device described above, and further comprising: a flexible frame supported by a mounting plate having at least one fiber alignment feature, the flexible frame having a central axis about which are arranged top and bottom rails having ends that define an input end and opposing inner circumferential blades and that define centrally located inwardly extending offset protrusions.

Another aspect of the disclosure is the device described above, and further comprising: top and bottom handles that respectively slidingly engage with the top and bottom rails of the flexible frame, wherein axially sliding the top and bottom handles cause the rails to move inwardly toward the flexible frame central axis so that the inner blades close and the offset protrusions come together at the central axis.

Another aspect of the disclosure is the device described above, wherein the top and bottom handles support opposing outer blades adjacent the inner blades, and wherein the outer blades close when the handles are axially slid with respect to the flexible frame.

Additional features and advantages will be set forth in the Detailed Description which follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The entire disclosure of any publication or patent document mentioned herein is incorporated by reference.

Cartesian coordinates are shown in some of the Figures for the sake of reference and are not intended to be limiting as to direction or orientation.

First Embodiment

Figure 1A:
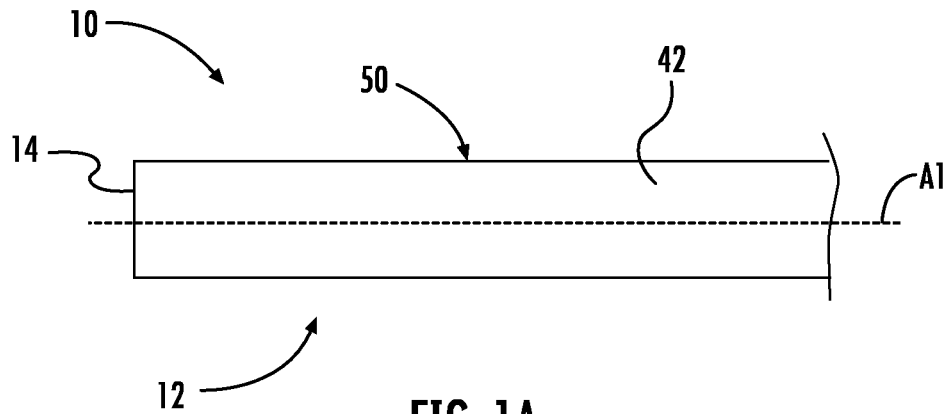
FIG. 1A is a side view and FIG. 1B is an end-on view of an example prior art tight-buffered optical fiber.
Figure 1B:
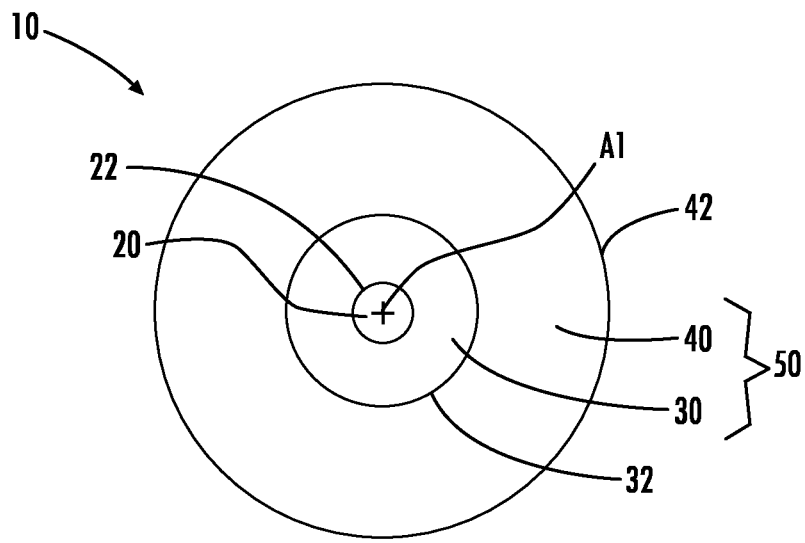

FIG. 1A is a side view of an end portion of an example tight-buffered optical fiber ("buffered fiber") 10 and FIG. 1B is a cross-sectional view of the buffered fiber of FIG. 1A. Buffered fiber 10 has a central axis A1 and an end portion 12 that includes an end 14. Buffered fiber 10 includes a glass fiber 20 having an outer surface 22, which is immediately surrounded by a coating layer ("coating") 30 having an outer surface 32. Coating 30 is immediately surrounded at its outer surface 32 by buffer layer ("buffer") 40 having an outer surface 42. Coating 30 and buffer 40 define a protective cover 50 for glass fiber 20.

Figure 2:
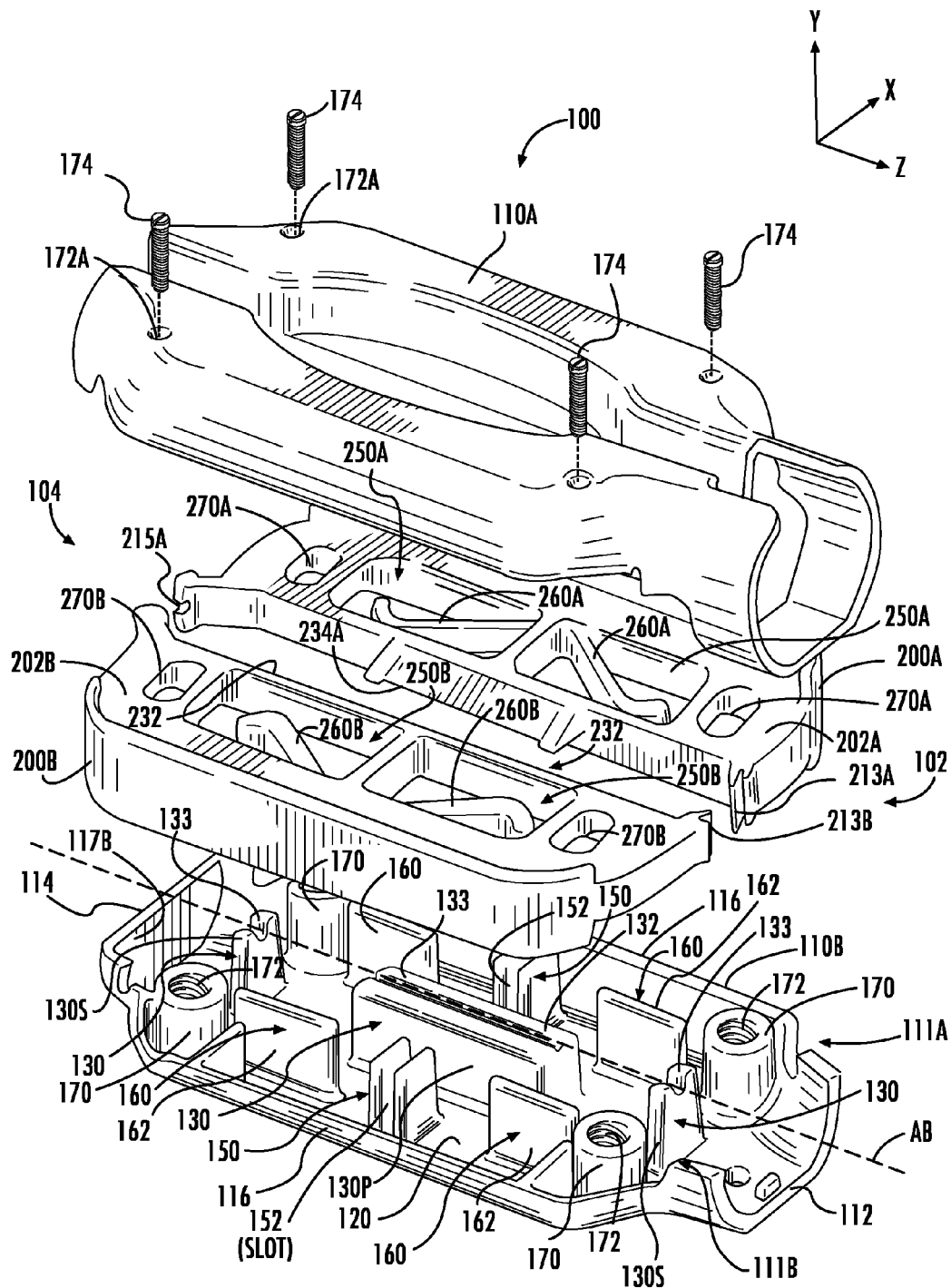
FIG. 2 is an exploded view of a first example of a stripping device according to the disclosure.
Figure 3:
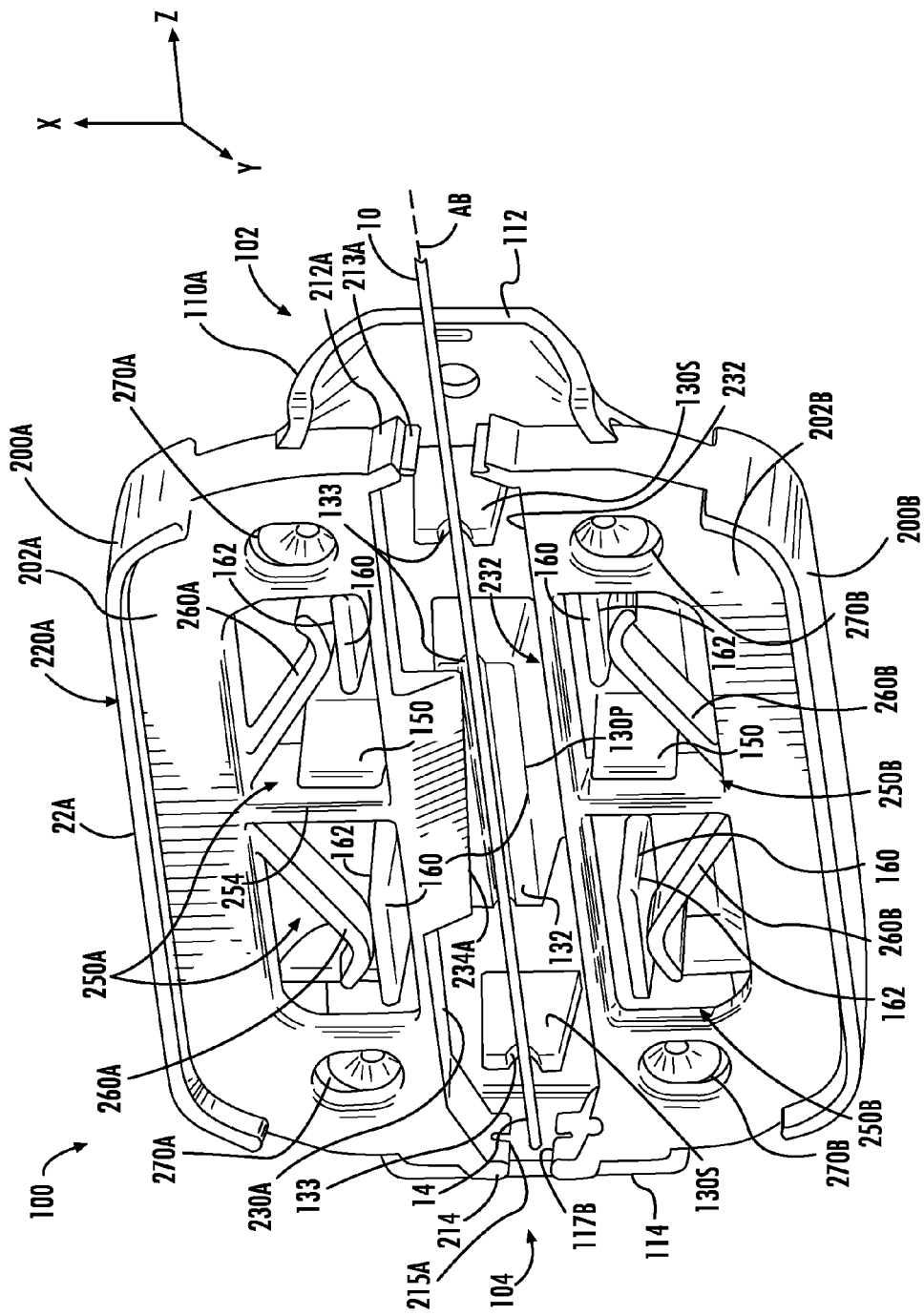
FIG. 3 is an elevated view of a portion of assembled stripping device of FIG. 2 showing top and bottom handles operably arranged with rear housing section.
Figure 4A:
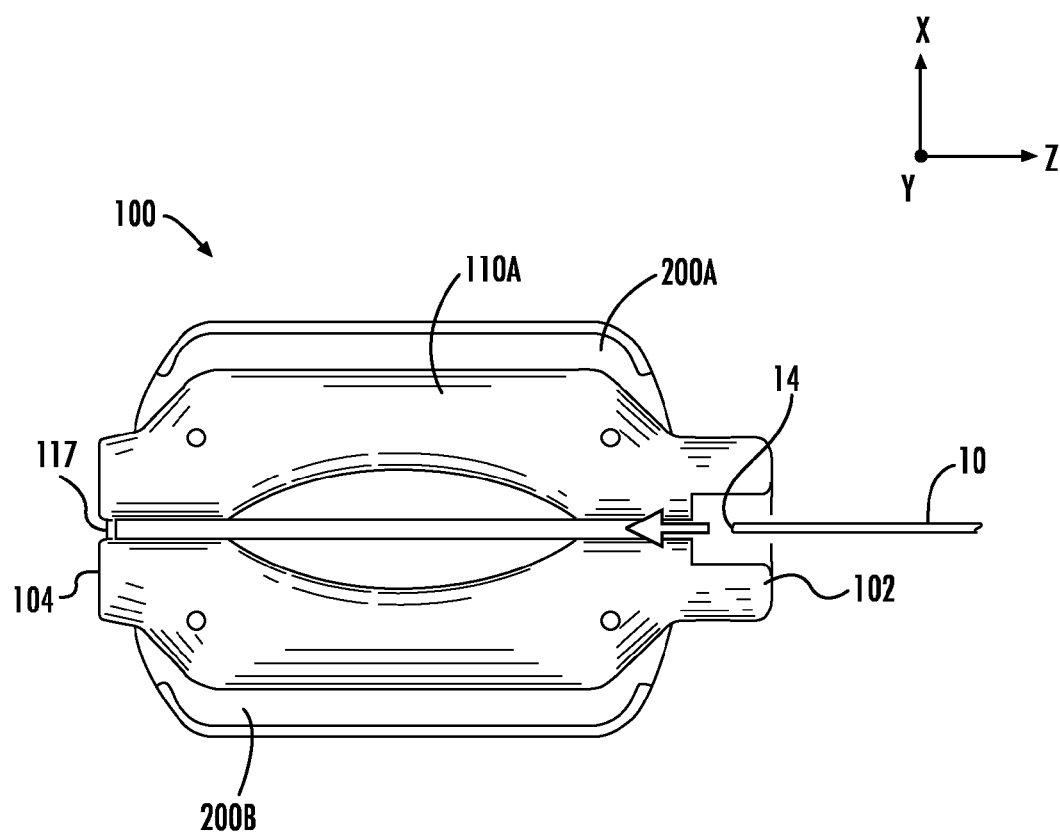
FIGS. 4A through 4B show the stripping device of FIG. 2 and illustrate the three main steps of inserting the buffered fiber into the device (FIG. 4A), squeezing the handles to make the three cuts (FIG. 4B), and pulling the buffered fiber from the device to retrieve the buffered fiber now having a stripped and cleaned glass fiber end (FIG. 4C)
Figure 4B:
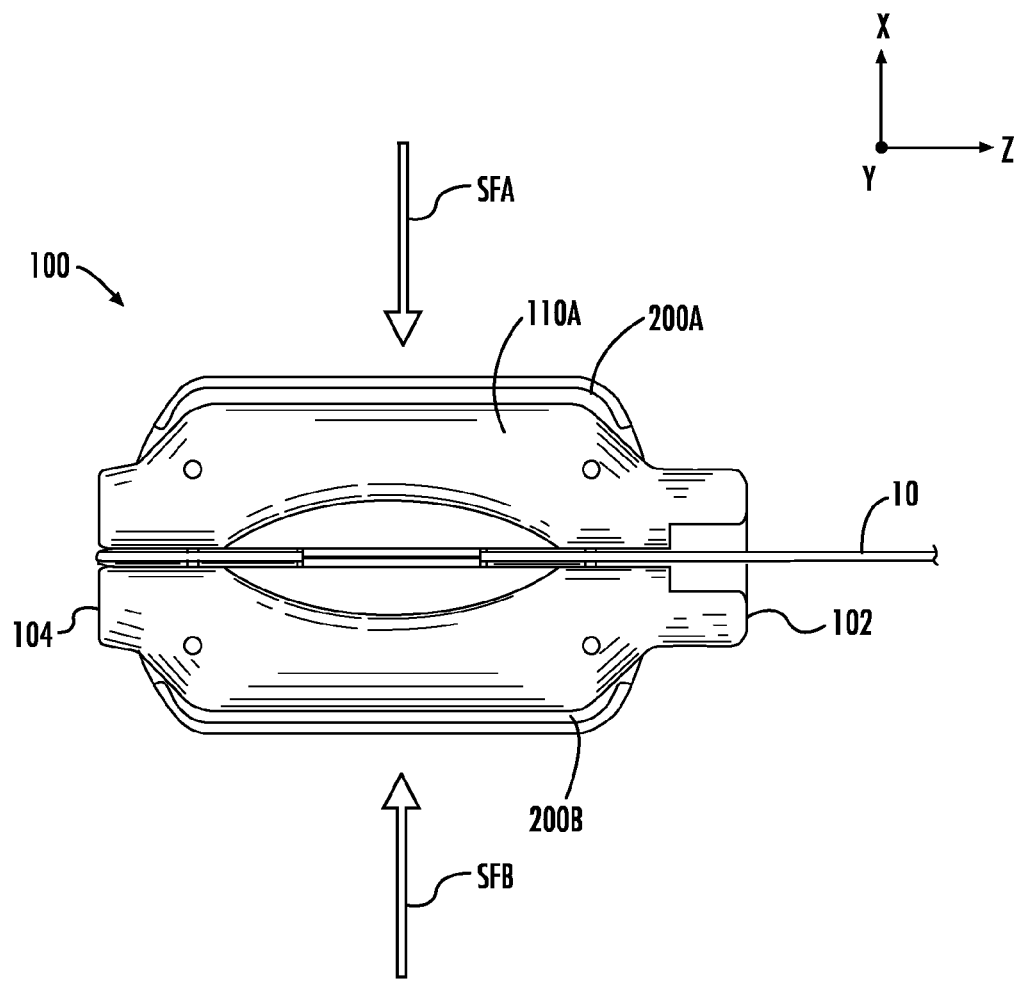
Figure 4C:
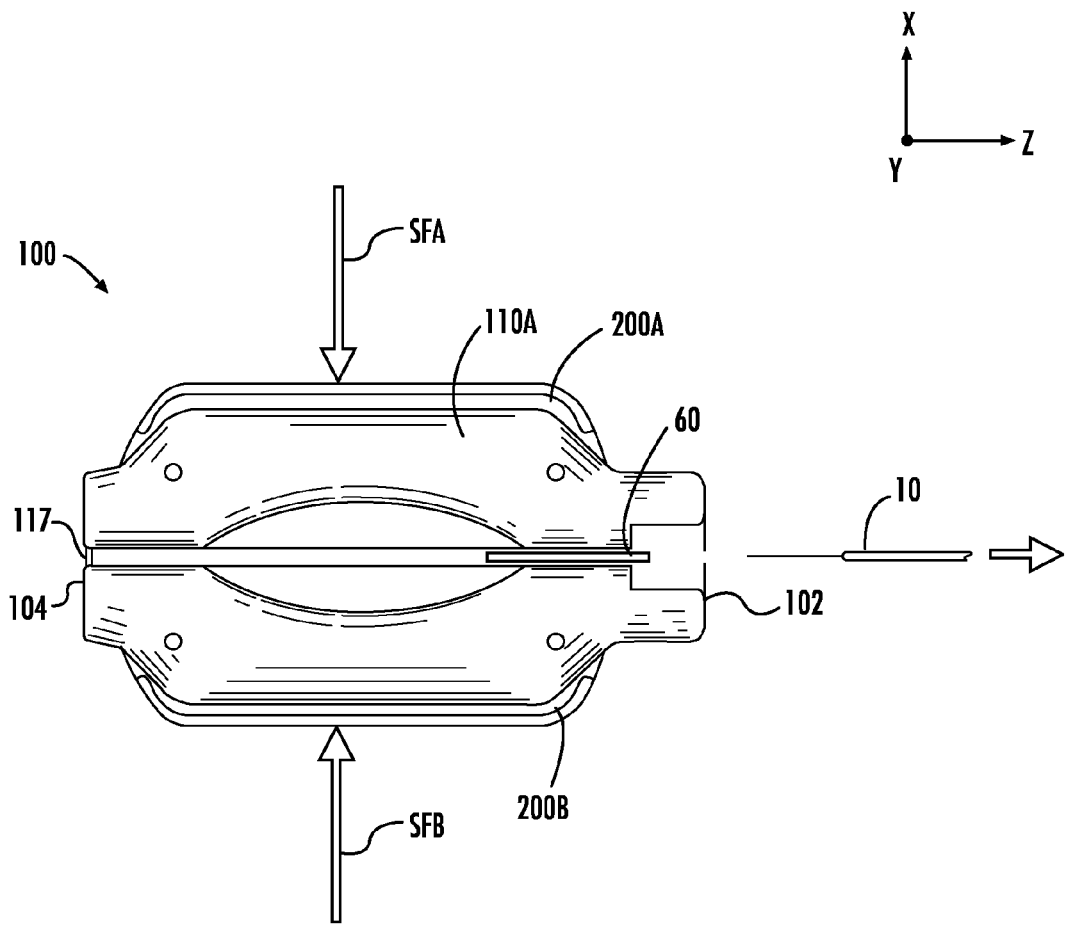

FIG. 2 is an exploded view of an example stripping device 100 designed for stripping a portion of buffered fiber 10 to expose a select length of glass fiber 20. FIG. 3 is an elevated view of a portion of stripping device 100. FIGS. 4A through 4C are side views that show stripping tool 100 in the process of stripping buffered fiber 10.

With references in particular to FIG. 2 and FIG. 3, stripping device 100 includes an input end 102 and a terminal end 104. Stripping device 100 includes front and rear housing sections 110A and 110B, the latter of which is configured to operably support opposing top and bottom handles 200A and 200B in a movable arrangement. FIG. 3 shows top and bottom handles 200A and 200B operably arranged with rear housing section 110B and omits front housing section 110F for ease of illustration.

Rear housing section includes a central longitudinal axis AB that divides the rear housing section into equal-size top and bottom sections 111T and 111B. Rear housing section also has opposite input and terminal ends 112 and 114, opposite sides 116, and an inside surface 120. Rear housing section includes at least one fiber support feature 130 arranged along axis AB that serves to support and guide buffered fiber 10 when an end portion of the buffered fiber is inserted into and resides within stripping device 100.

In an example, the at least one fiber support feature 130 is defined by a central fiber support pedestal 130P that upwardly extends from inside surface 120 and that has a flat surface 132 that optionally includes a central groove 133 configured to accommodate buffered fiber 10. In an example, additional fiber support features 130 in the form of first and second fiber support members (stands) 130S are axially disposed adjacent the fiber support pedestal 130P at or towards the input end and terminal ends 112 and 114, respectively. First and second fiber support members 130S each include a groove 133 aligned with the groove in support pedestal 130P and configured to accommodate buffered fiber 10 along a straight line, i.e., along axis AB.

Rear housing section 110B also includes first and second handle guiding features 150 that extend from inside surface 120 and that reside adjacent central fiber support pedestal between opposite sides 116. The first and second handle guiding features 150 each define a slot 152 whose function is described below.

Rear housing section 110B also includes four ledges 160 that extend from inside surface 120, with pairs of ledges located on either side (in the Z-direction) of the first and second handle guiding features 150, with each of the ledges having a planar surface 162 that lies in the Y-Z plane. Rear housing section 110B also has four posts 170 that extend from inside surface 120 and reside generally at the four corners of rear housing section 110. Each post 170 includes a threaded hole 172 for receiving and engaging a screw 174 that holds together the front and rear housing sections 110A and 100B.

With continuing reference to FIGS. 2 and 3, top and bottom handles 200A and 200B have similar configurations and are respectively supported in a confronting configuration in the top and bottom sections 111T and 111B of rear housing section 110B. Top handle 200A includes a body 202A having an input end 212A, a terminal end 214A, an upper side 220A that includes a flat surface portion 222A to facilitate hand engagement as discussed below, and a lower side 230A that includes an angled cutting blade 234A. Body 202A includes first and second openings 250A separated by a central post 254A that runs in the X-direction. First and second resilient members 260A downwardly depend from body 202A at post 254 into the first and second openings 250A, respectively.

Body 202A of top handle 200A also has first and second holes 270A that respectively reside between the first and second openings 250A and the input and terminal ends 212A and 214A. First and second holes 270A are elongate in the X-direction.

Input end 212A includes a cutting blade 213A, and terminal end 214A includes a cutting blade 215A. Cutting blade 215A can be curved to perform a circumferential cut.

The configuration of bottom handle 200B is the same as top handle 200A and has the same reference numbers but with the suffix "B" rather than "A", and with the exception that the lower side 230 of the bottom handle does not include an angled blade like blade 234T but rather includes a flat surface 232B.

With reference in particular to FIG. 3, top handle 200A is operably arranged with rear housing section 110B in top section 111T by arranging central post 254T within slot 152 of upper handle guiding feature 150 so that resilient members 160T rest upon respective surfaces 162B of upper ledges 160B. Likewise, bottom handle 200B is operably arranged with rear housing section 110B in bottom section 111B by arranging central post 254B within slot 152B of lower handle guiding feature 150B so that resilient members 260B rest upon respective surfaces 162B of lower ledges 160B. This places top and bottom handles 200A and 200B in a configuration where their respective lower sides 230A and 230B are spaced apart but confronting one another, with angled blade 234T residing adjacent central fiber support pedestal 130B. This position constitutes an open position for stripping device 100.

Front housing section 110A is connected to rear housing section 110B using screws 174 through holes 172A therein that align with threaded holes 172B of posts 170B and also holes 270A and 270B in top and bottom handles 200A and 200B. Note that the elongate holes 270A and 270B accommodate motion of top and bottom handles in the +X and −X directions, respectively. Such motion, which is generally initiated by squeezing top and bottom handles 200A and 200B together by hand, puts stripping device 100 in a "closed" position, with input end blades 213A and 213B at input end 102 of stripping device 100 coming together, terminal end blades 215T and 215B at terminal end 104 of the stripping device coming together, and angled blade 234T moving toward planar surface 232B but not coming into contact. Resilient members 260A and 260B are compressed during squeezing and provide a restoring force that acts to push apart top and bottom handles 200A and 200B when the squeezing force is released, thereby automatically placing the device automatically in the open position. Other configurations for resilient members 260B and bottom housing section can be used to achieve the same automatic opening effect.

With reference now also to FIGS. 4A through 4C and also FIGS. 5A through 5D, to perform stripping of buffered fiber 10, the buffered fiber is inserted into stripping device 100 at input end 102 and all the way through to terminal end 104 when the stripping device is in the open position. The portion of buffered fiber 10 that resides within stripping device 100 is guided and supported by the at least one fiber support features 130, such as central fiber support pedestal 130P and the two ancillary fiber support members 130S. This support is facilitated if stripping device 100 is oriented so that gravity is in the −Y direction, which causes buffered fiber 10 to rest against central fiber support pedestal 130P and ancillary support members 130S.

In an example, bottom housing section 110B includes at terminal end 112B a terminal end wall 117B that serves as an end stop against which buffered fiber end 14 abuts. Terminal-end blades 215A and 215B are configured to cut through buffered fiber 10 at a position P1 near end 14 to form a new, cleanly cut end 14. Input-end blades 213A and 213B are configured to cut down through buffer 40 and core 30 but not through fiber core 20 at a position P3. This forms a strippable or movable portion 60 of cover 50, while the portion of cover 50 to the right of position P3 is considered "fixed."

Terminal-end blades 215A and 215B are located a distance d1 from the center of angled blade 234A, which is at a position P2. Angled blade 234A slices into the top portion of buffer 40 at an angle (i.e., not at right-angles to axis A1 of the buffered fiber) down to coating 30. This angle facilitates removing a top portion of the buffer by angled blade 234T when buffered fiber 10 is pulled from stripping device 100, thereby leaving a pre-determined length d1 of buffer 40 on fiber 10 when the buffered fiber is stripped as described below. The center of angled blade 234T is located a distance d2 from input end blades 213T and 214B.

Figure 5A:
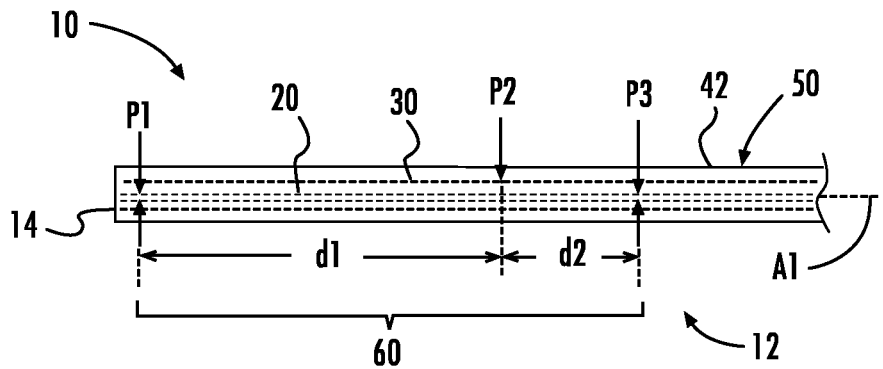
FIG. 5A is a cross-sectional view of an end portion of the buffered fiber illustrating the three positions and the corresponding depths to which the buffered fiber is initially cut by the stripping device of FIG. 2.

FIG. 5A is a cross-sectional view of an end portion of buffered fiber 10 illustrating the three positions P1 through P3 and the corresponding depths to which the buffered fiber is initially cut, and shows the aforementioned dimensions d1 and d2.

Figure 5B:
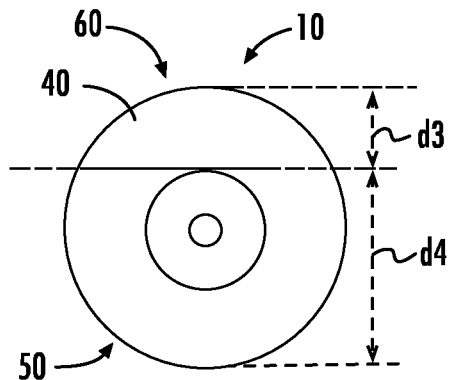
FIG. 5B is a cross-sectional view of the buffered fiber 10 of FIG. 5A, showing the depth of the cut into a top portion of the buffer layer down to the coating layer by the angled blade.

Thus, once buffered fiber 10 is inserted into input end 102 of stripping device 100 so that buffered fiber end 14 stops at terminal wall 117B as shown in FIG. 4A, then with reference to FIG. 4B, a user (not shown) squeezes together (e.g., by hand) top and bottom handles 200A and 200B. The squeezing force is represented by arrows SFA and SFB. This simultaneously results in: 1) a small end portion of buffered fiber 10 being cut off at a position P1 adjacent end 14 by terminal-end blades 215T and 215B to define a new end 14; 2) a top portion of buffer 40 being cut at a position P2 at an angle and down a distance d3 to coating 30, as shown in FIG. 5B; and 3) input end blades 213A and 213B cutting through buffer 40 and core 30 down to glass fiber 20 at a position P3, to define the strippable section of the cover.

Figure 5C:
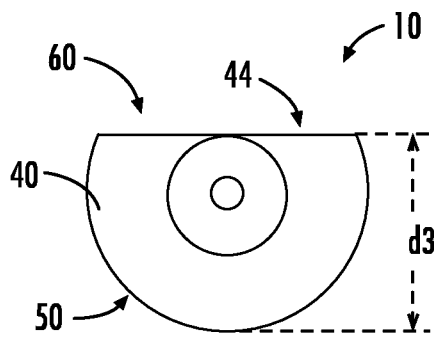
FIG. 5C is similar to FIG. 5B and shows how the angled blade strips off a top portion of the buffer layer down to the coating layer when the buffered fiber is pulled from the stripping device of FIG. 2.
Figure 5D:
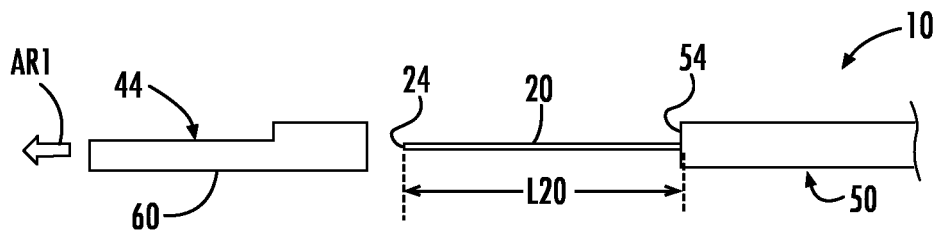
FIG. 5D is a side view of the removable portion of the cover formed by the cutting action of the stripping device, and showing how the removable covered portion slides from the buffered fiber to leave a clean bare glass fiber section extending from the (fixed) cover.

Once these three cuts are made to buffered fiber 10, then with reference to FIG. 4C, the user maintains the squeezing force on top and bottom handles 200A and 200B and then pulls the buffered fiber in the −Z direction from stripping device 100. FIG. 5C is a side view of the resulting buffered fiber 10 and shows the removable (stripped) cover section 60 of buffered fiber 10 that is removed from the buffered fiber when the buffered fiber is pulled from stripping device 100. Note that the stripping action of angled blade 234A creates a flat portion 44 in buffer 40 while leaving a portion of the buffer intact. The creation of flat section 44 makes it easier to remove cover section 50 from glass core 20 by removing some of the normal force that keeps cover 50 fixed to glass fiber 20.

Because cover section 60 slides off of glass fiber 20, the portion of the buffer that remains intact acts to clean the resulting bare section of glass fiber 20. This bare section of glass fiber 20 has a length L20=d1+d2 that extends from the end 54 of cover 50. In an example embodiment, d1 is in the range from about 25 mm to about 30 mm and d2 is in the range from about 10 mm to 15 mm. In an example embodiment, length L20 is in the range from about 35 mm to about 45 mm.

The method of stripping buffered fiber 10 as disclosed herein thus includes performing the following acts simultaneously during the act of squeezing handles 200A and 22B and pulling the buffered fiber from the stripping device 100: 1) cutting buffered fiber 10 at position P1 near end 14; 2) slicing off a top portion of cover 50 starting at position P2; 3) circumferentially cutting the cover 50 at position P3 down to the glass fiber to define a cover section 60 that can be slidingly removed from buffered fiber 10; and 3) sliding the removable cover section 60 from the glass fiber to leave exposed a cleaned, bare section of fiber 20 of length L20.

Second Embodiment

Figure 6A:
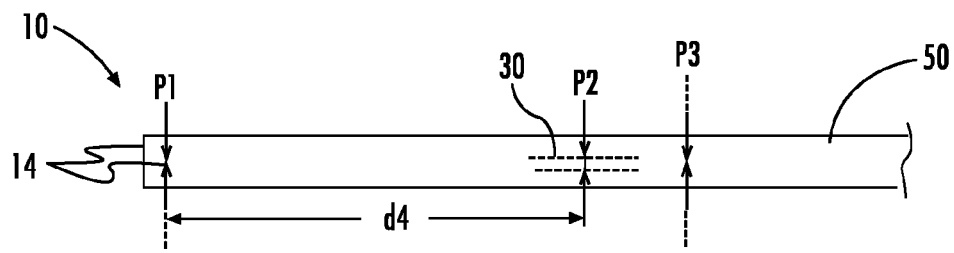
FIGS. 6A through 6C are side views of a buffered fiber 10 at various steps along the way during a stripping operation according to a second embodiment of the disclosure.
Figure 6B:
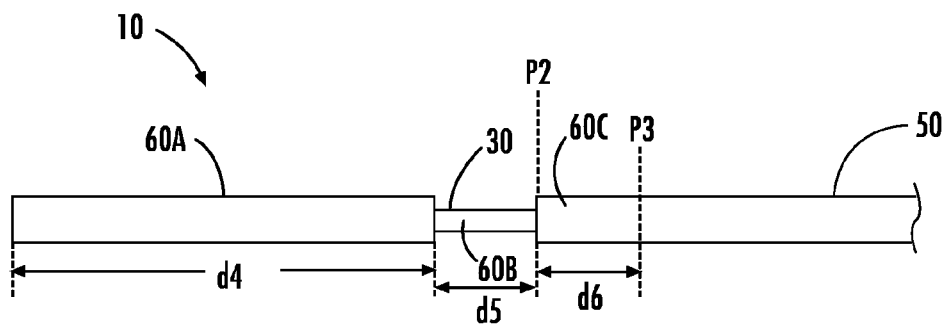
Figure 6C:
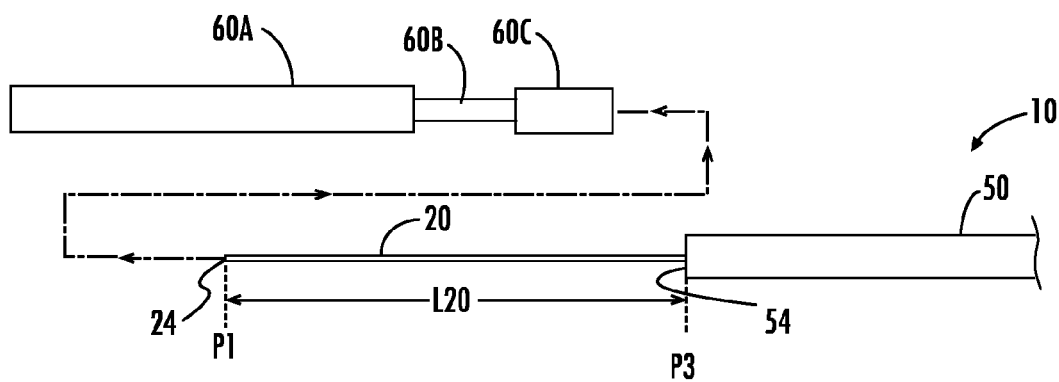

FIGS. 6A through 6C are side views of buffered fiber 10 at various steps along the way during an example stripping operation according to a second embodiment of the disclosure. In FIG. 6A, buffered fiber 10 is cut through at a position P1 adjacent end 14 to define a new, cleanly cut end 14. In addition, cover 50 of buffered fiber 10 is circumferentially cut at position P2 at a distance d4 from position P1 into buffer 40 down to coating 30. In FIG. 6B, the cut cover section of length d4 defines a removable movable (strippable) sub-section 60A that is pulled away from the main buffered fiber 10 to expose a short cover sub-section 60B of coating 30 of length d5. In an example embodiment, distance d5 is 10 mm to 20 mm.

FIG. 6B also shows a third position P3 a distance d6 away from position P2 where cover 50 of buffered fiber 10 is circumferentially cut down through buffer 40 and coating 30 down to glass fiber 20 to define a third removable (strippable) cover sub-section 60C that includes a portion of the buffer and a portion of the coating.

Then, as shown in FIG. 6C, removable cover section 60 is constituted by removable cover sub-sections 60A, 60B and 60C, which are pulled off of glass fiber 20, with cover section 60C serving to clean the exposed glass fiber. Exposed glass fiber 20 has a length L20=d4+d6, which in an example is between 35 mm and 45 mm. In an example embodiment, the actions carried out in connection with FIGS. 6A and 6B constitute a first step of the stripping process and the actions carried out in connection with FIG. 6C constitute a second step of the stripping process.

In the first stripping step, moving first cover sub-section 60A away from main cover 50 and exposing a section of coating 30 serves to reduce the amount of normal force holding cover 50 to glass fiber 20. The deeper cut at P3 allows for the length L20 of glass fiber 24 to be exposed in the second stripping step by pulling off the combined cover sections 60A, 60B and 60C.

Figure 7A:
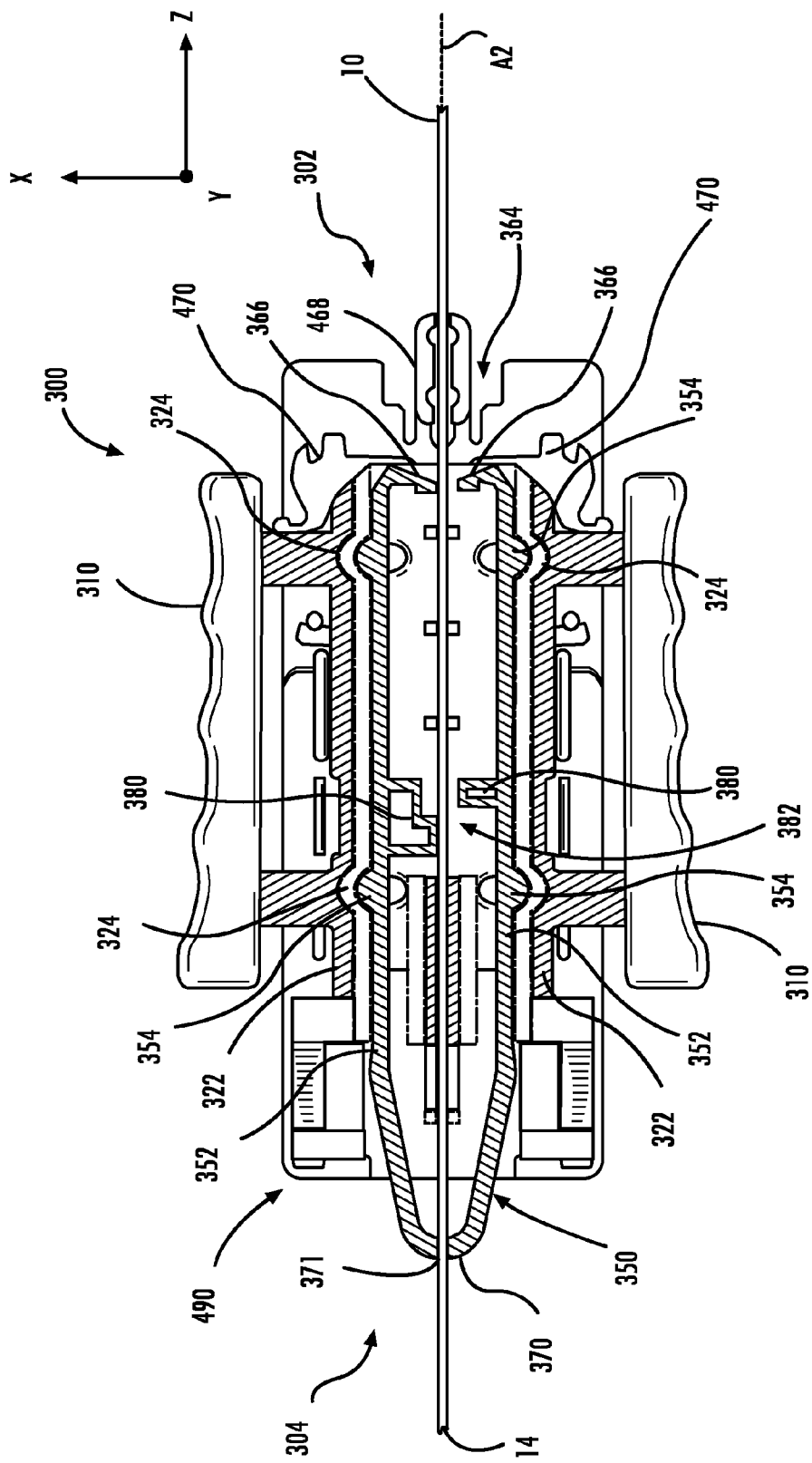
FIGS. 7A through 7C are cross-sectional diagrams of an example stripping device 300 configured to perform the above-described two-step stripping process shown in FIGS. 6A through 6C.
Figure 7B:
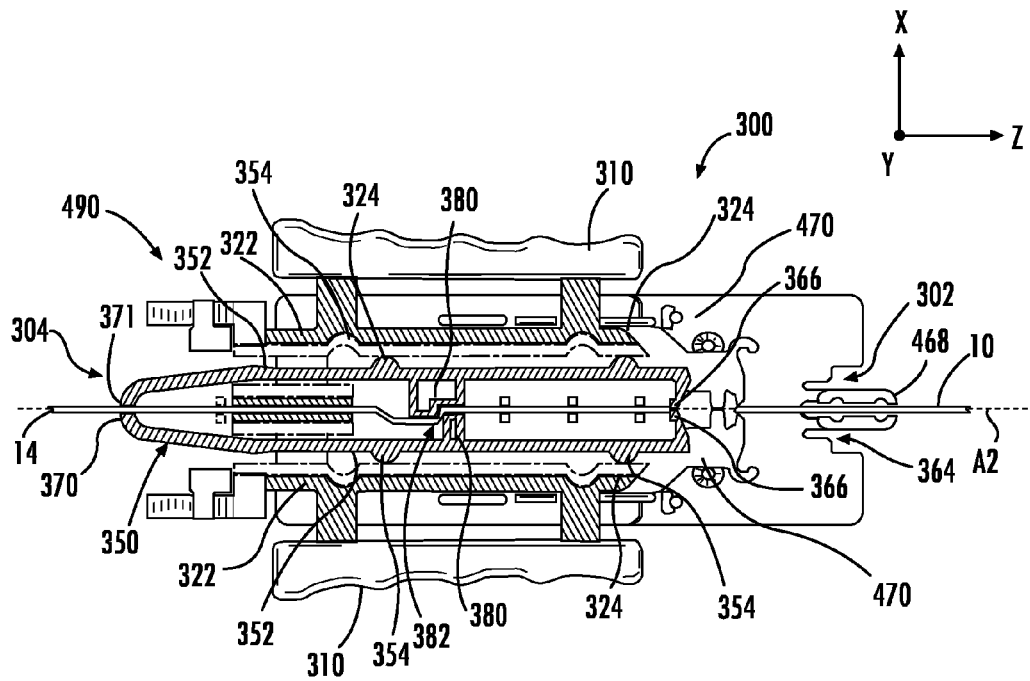
Figure 7C:
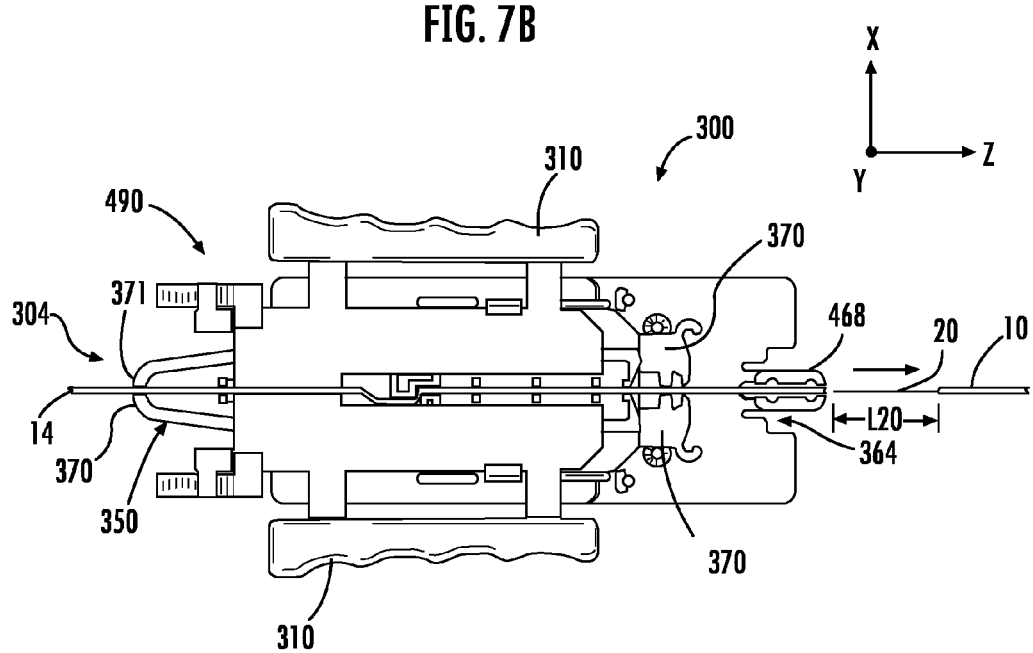
Figure 7D:
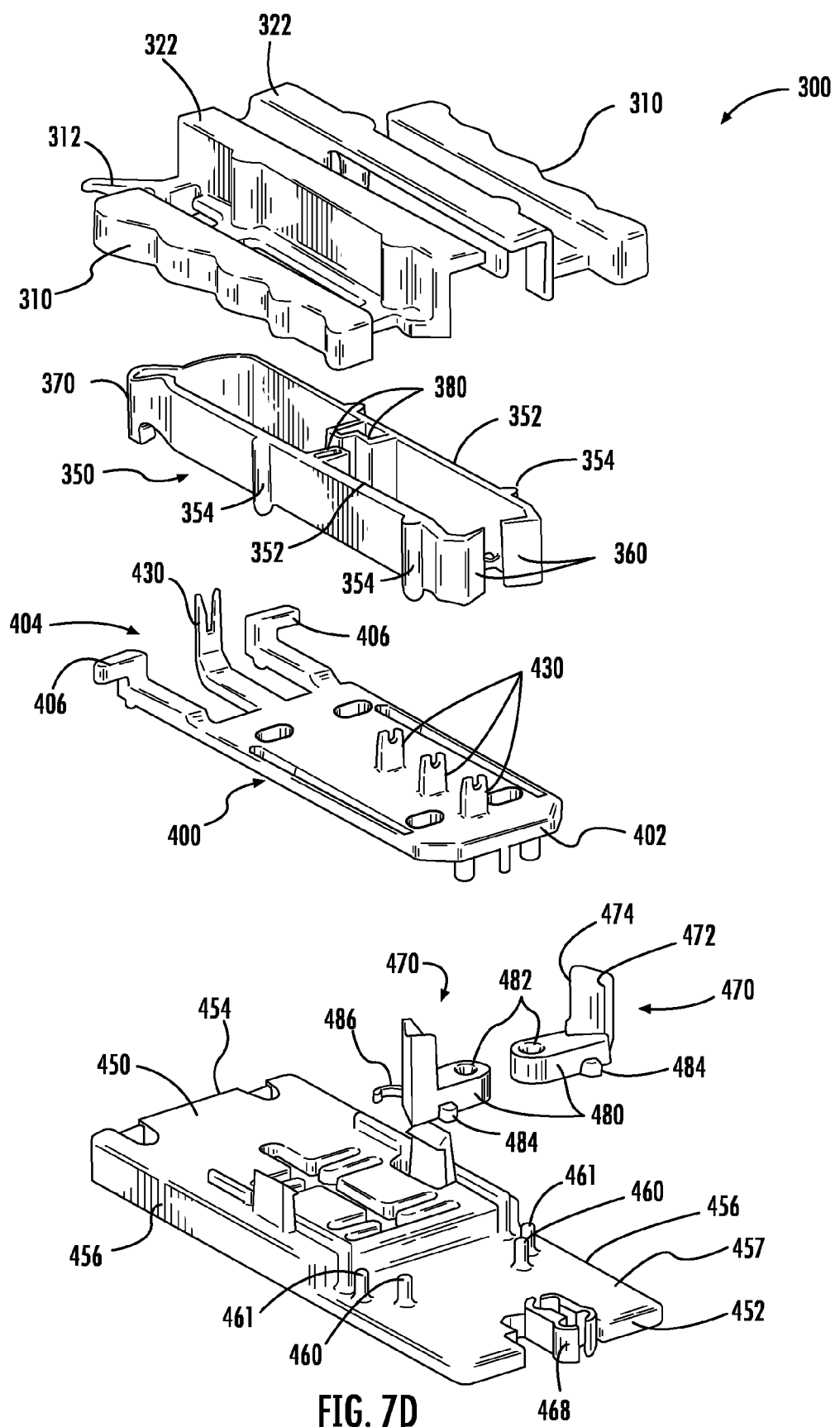
FIG. 7D is an exploded perspective view of the stripping device of FIGS. 7A-7C.

FIGS. 7A through 7C are cross-sectional diagrams of an example stripping device 300 configured to perform the above-described two-step stripping process shown in FIGS. 6A through 6C. FIG. 7D is an exploded view of stripping device 300.

Stripping device 300 has a central axis A2, an input end 302 into which buffered fiber 10 can be inserted, and also has a terminal end 304 where buffered fiber 10 is cut to a select length, as described below. Stripper device 300 includes opposing top and bottom slidable handles 310 each having rails 322 that run parallel to the Z-axis on opposite sides of central axis A2. Stripper device 300 also includes a U-shaped flexible frame 350 that includes top and bottom rails 352 that respectively engage the top and bottom rails 322 of slidable handles 310. In an example, flexible frame 350 is made of strong plastic.

In an example embodiment, top and bottom rails 352 of flexible frame 350 have two outer semicircular detents 354 that engage complementary indents 324 on rails 322 of top and bottom handles 310. Flexible frame 350 includes an open input end 362 having opposing spaced apart inner blades 366. Top and bottom rails 352 are connected at a closed end 370. This configuration allows the flexible frame 350 to inwardly flex so that the top and bottom rails 352 can move towards each other so that inner blades 366 can come together. Flexible frame 350 is centered on central axis A2 so that this axis that passes through the center of inner blades 366.

Flexible frame 350 includes at about its midpoint first and second protrusions 380 located on top and bottom rails 352. First and second protrusions 380 extend inwardly toward central axis A2 and define an opening 382 through which buffered fiber 10 can pass when the flexible frame remains unflexed. First and second protrusions 380 are configured so that when flexible frame 350 is inwardly flexed, protrusions come together in a mating fashion, wherein of the protrusions crosses axis A2.

Flexible frame 350 is operably supported on a support plate 400 that has a front end 402 and a back end 404. Back end 404 includes sledge members 406. Support plate is configured to operably support top and bottom handles 310 and flexible frame 350. Support plate 400 includes at least one central fiber alignment feature 430 that lies along central axis A2 of flexible frame 350 and that serves to guide and support buffered fiber 10.

Support plate 400 is in turn operably supported by a base plate 450 that has a front end 452, a back end 454 and sides 456. Base plate includes a floor 457 from which upwardly extend two sets of mounting pins 460 and two sets of stopping pins 461. A fiber guide 468 resides at back end 454 along central axis A2 of stripping device 300. Base plate 450 also includes two clip members 469 that reside near respective sides 456 and that upwardly extend from floor 457. Clip members 469 are used to secure flexible frame 350 when the flexible frame is in the open position.

Stripping device 300 includes opposing second or outer blades 470 configured to be operably supported by base plate 450. Each outer blade 470 includes a cutting member 472 with a cutting edge 474 and a base 480 that includes an opening 482, a rotational stop 484 and a hook 486. In an example, outer blades 470 are made of metal. Blades 470 are referred to as "outer blades" because they reside closer to input end 302 of stripping device 300 than inner blades 366.

Outer blades 420 are mechanically configured to rotate to a closed position when top and bottom handles 200A and 200B are slid forward, as described below. This is accomplished, for example, by handles 200A and 200B engaging and pulling on respective hooks 486, which causes the blades to rotate around their corresponding mounting pin 460 that extends into opening 482. Over-rotation of outer blades 470 is prevented by rotational stop 484 making contact with stopping pins 461 as the blades rotate around their respective mounting pins 460.

Stripping device 300 includes a locking mechanism 490 configured to lock top and bottom handles in place so that flexible frame 350 is in an open (unflexed) configuration, and when unlocked allows for top and bottom handles 310 to slide axially, i.e., along the direction of central axis A2. In an example, locking mechanism 490 includes sledges 406 engaging front protrusions 312 of respective handles 310

With reference now to FIG. 7A, in the operation of stripping device 300, buffered fiber 10 is inserted into input end 302 and through outer blades 470 and then inner blades 466. Buffered fiber is aligned and supported by the at least one fiber alignment feature 430 and passes through opening 382 defined by opposing protrusions 380. In an example, end 14 of buffered fiber 10 can extend beyond terminal end 304 of stripping tool 300, e.g., through a hole 371 in end 370.

With reference now to FIG. 7B, locking mechanism 490 is unlocked, thereby allowing top and bottom handles 310 to axially slide. This axial sliding causes detents 354 on rails 352 of flexible frame 350 to disengage indents 324 on handle rails 322. This in turn causes the detents to push against the flat portion of handle rails 322, which acts to inwardly flex rails 352 of flexible frame 350. This causes inner blades 366 to circumferentially cut into cover 50 of buffered fiber 10 down to coating 30. Also, the sliding forward of top and bottom handles 200A and 200B causes outer blades 470 to rotate into a closed position to cut cover 50 of buffered fiber 10 down through coating 30 to glass fiber 20.

Meanwhile, because rails 352 of flexible frame move toward one another during the flexing of flexible frame 350, protrusions 380 move toward one another. In the example shown in FIG. 7B, one of the protrusions 380 extends beyond central axis A2 and pushes downward on buffered fiber 10 in a manner that breaks the glass fiber within while also pulling the buffered fiber in the Z-direction, i.e., toward the terminal end 302. Thus, protrusions 380 represent an example configuration of a fiber breaking and pulling assembly within stripping device 300.

The pulling action of the protrusions 380 causes inner blades 366 to strip a portion of 40 from buffered fiber 10 to reveal a short section of coating 30, which is denoted in FIG. 6B as second cover section 60B. The first cover section 60A is trapped by protrusions 380. Also, the sharp bending angle of buffered fiber 10 caused by the overlapping protrusions 380 breaks glass fiber 20 and also holds the buffered fiber 10. Meanwhile, cover section 60C is defined by the closing of outer blades 410, and is the portion of cover 50 residing between the inner and outer blades 366 and 410.

With reference now to FIG. 7C and also to FIG. 6C, buffered fiber 10 is then pulled from stripping device 300, with outer blades 410 also serving the function of stripping away all three sections 60A-60C of cover 50 to produce a stripped buffered fiber 10 having an end section of bare fiber 20 of the aforementioned length L20.

Figure 7E:
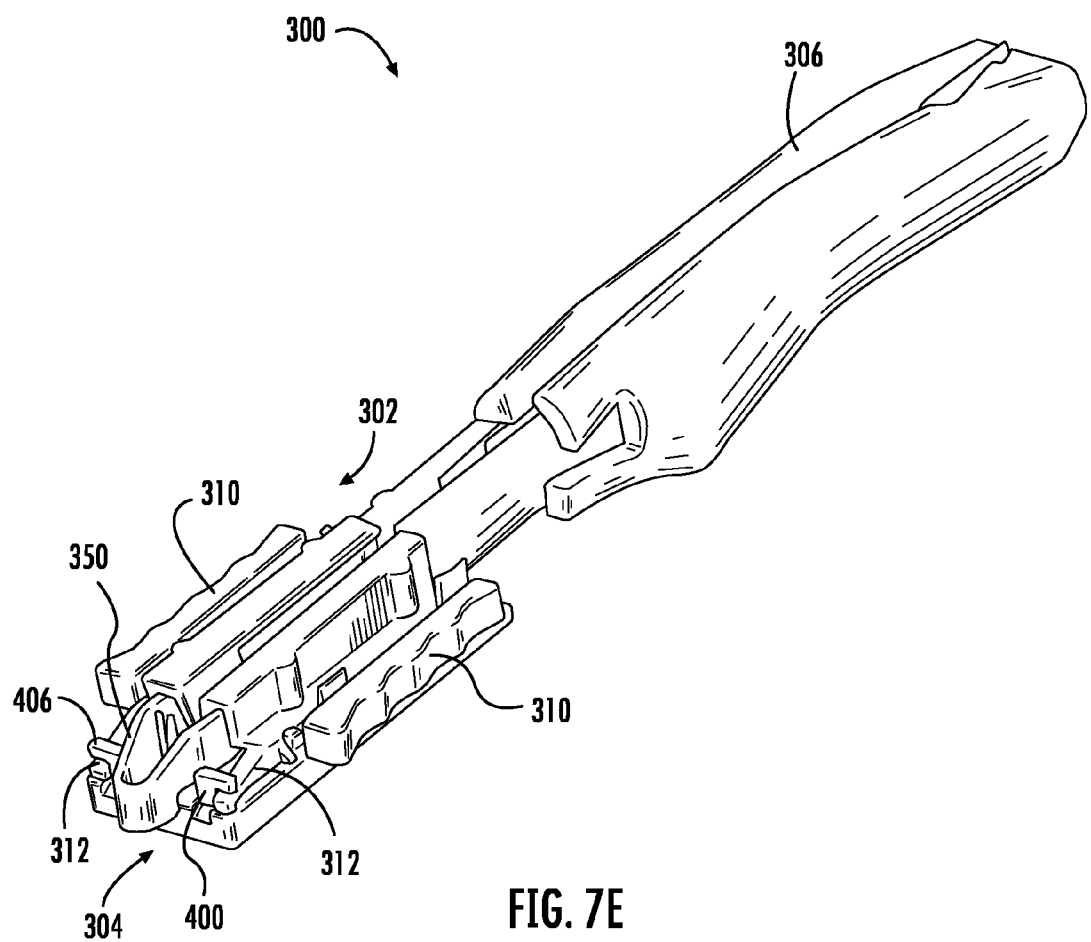
FIG. 7E is an elevated view of the stripping device of FIGS. 7A-7C including a handle attached to a front end.

FIG. 7E is an elevated view of an example stripping device 300 that includes a handle 306 that attached to front end 302.

Third Embodiment

Figure 8A:
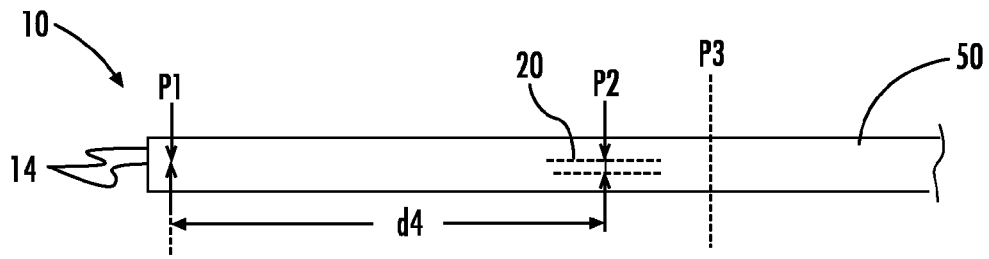
FIGS. 8A through 8C are similar to FIGS. 6A through 6C and illustrate a third example embodiment of a method of stripping a buffered optical fiber wherein the cover is removed in two pieces.
Figure 8B:
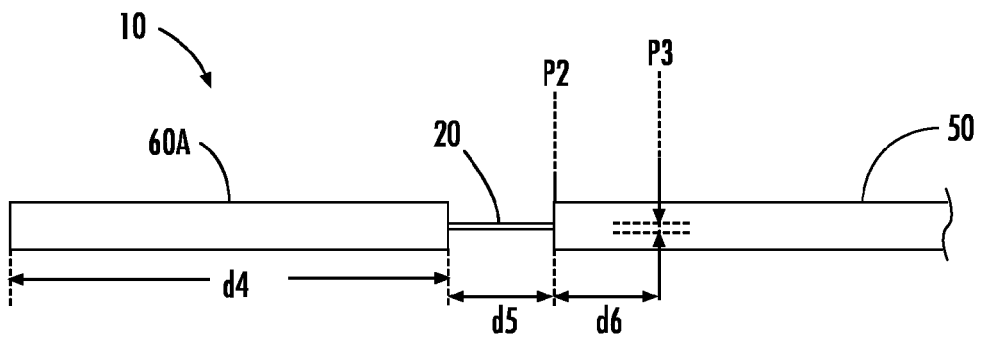
Figure 8C:
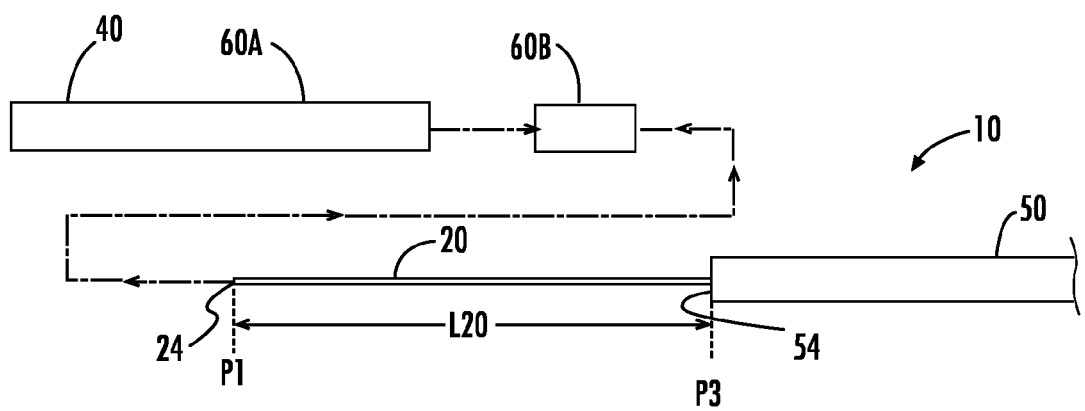

FIGS. 8A through 8C are similar to FIGS. 6A through 6C and illustrate a third example embodiment of a method of stripping buffered fiber 10. The cut in cover 50 at position P2 is down to glass fiber 20 and defines a movable cover section 60A, which is axially moved away from the stationary cover 50 by a distance d5. Then (or simultaneous with the cut at position P2 and the moving of movable cover section 60A), a cut down to glass fiber 20 is made at position P3 at a distance d6 from position P2, thereby defining a movable/removable cover section 60B of length d6. In an example, length d4 is about 40 mm and length d6 is between 10 mm and 15 mm, while length d5 can also be between 10 mm to 15 mm.

Thus, in FIG. 8C, cover sections 60A and 60B are pulled off of glass fiber 20, which has a length L20=d4+d6, e.g., from about 35 mm to about 45 mm. In this third embodiment, inner blades 360 of stripping device 300 can be used to clean the exposed portion of glass fiber 20 when the buffered fiber is pulled from the stripping device.

Thus, the third stripping embodiment generally includes performing first and second spaced-apart cuts into the buffered fiber 10, wherein one of the cuts (say, the second cut at position P3) defines a length L20 of the exposed glass fiber 20, and both cuts define axially movable sections 60A and 60B of cover 50. First movable section 60A is axially moved to expose a short section of glass fiber 20. Then both movable cover sections 60A and 60B are removed from glass fiber 20 by axially moving both sections.

In an example, this third stripping embodiment can be carried out by a modified version of stripping device 300 that does not include outer blades 470.

Experience has shown that trying to remove the entire cover 50 and buffer 30 from glass fiber 20 over length L20 often results in breaking the glass fiber. Thus, in this third example embodiment, forming a short movable/removable section 60A having a length less than the total desired length L20 of exposed glass fiber 20 and then axially displacing it from the fixed fiber cover serves to remove some of the normal force that otherwise keeps the cover 50 fixed to glass fiber 20. This in turn allows for a reasonable amount of force to be applied in the axial direction (say, between about 5 lbs and 8 lbs of force) to remove (e.g., in a single cutting step and a single pulling step), a sufficient length of cover 50 (in two separate sections 60A and 60B) to expose a section of glass fiber 20 having a desired length.

Fiber Cutting Device

Figure 9A:
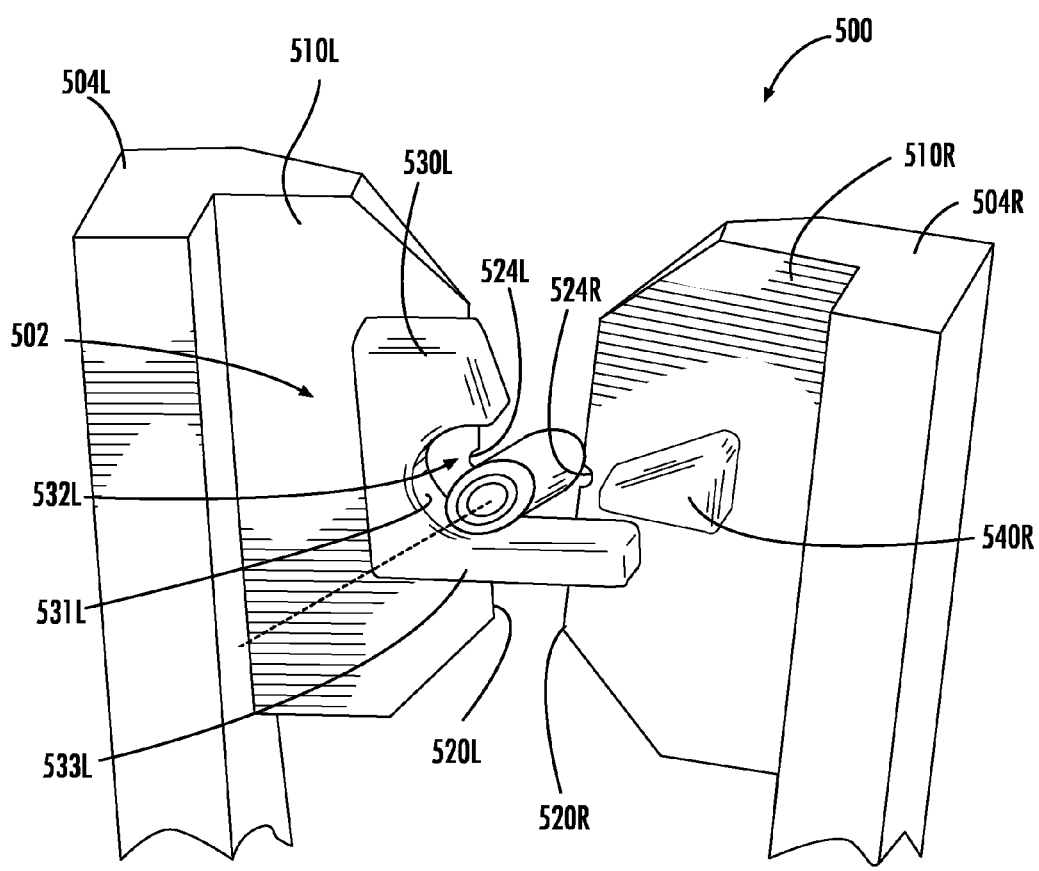
FIG. 9A through 9C are front elevated views of an example buffered fiber cutting device according to the disclosure.
Figure 9B:
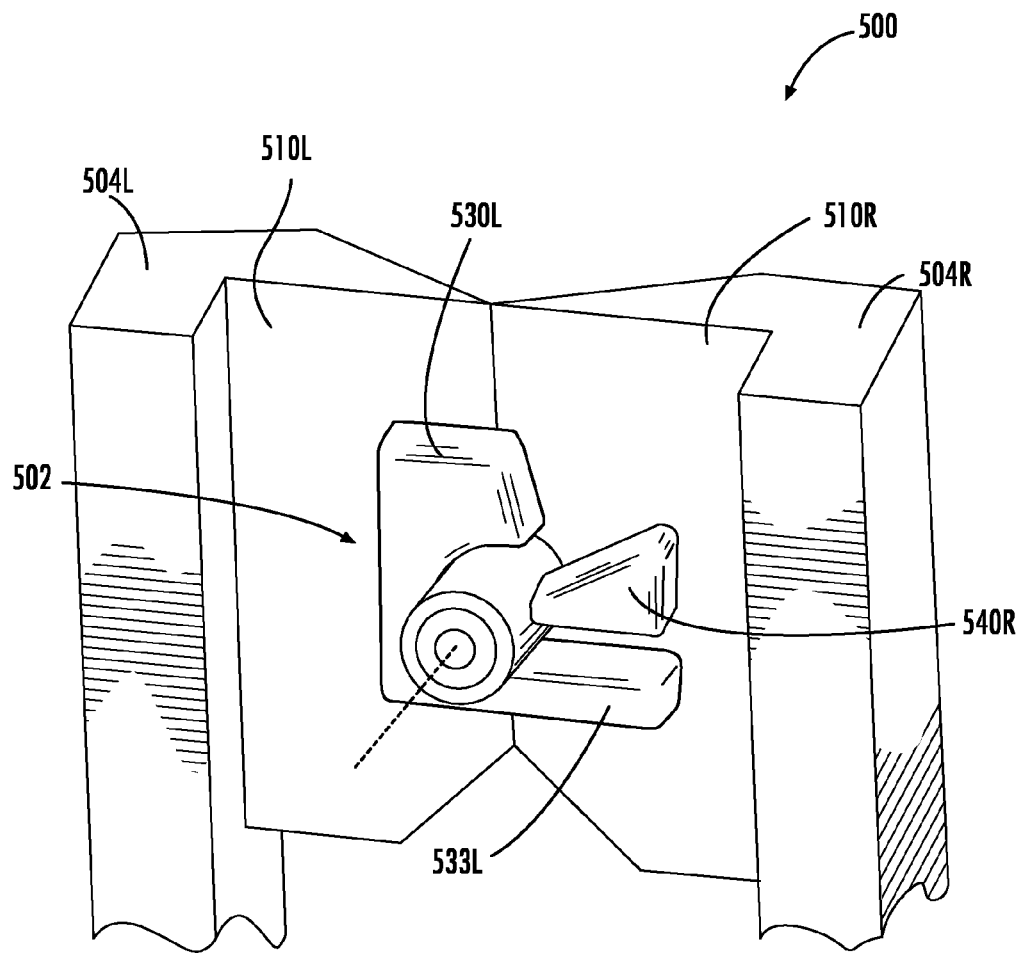
Figure 9C:
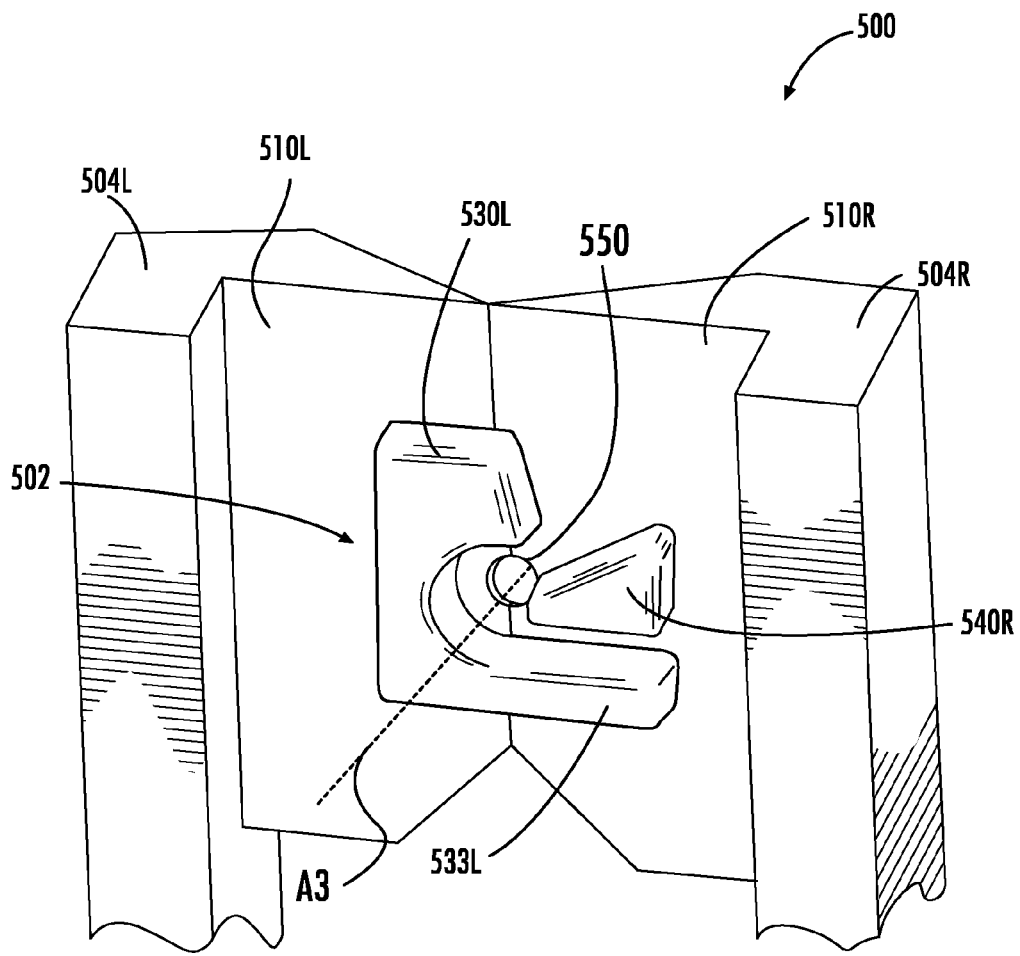

FIGS. 9A and 9B illustrate an example embodiment of a buffered fiber cutting device ("device") 500 that includes an alignment structure 502 that keeps buffered fiber 10 aligned within the cutting device when the buffered fiber is being circumferentially cut. Alignment structure 502 can be used for inner blades 360 or outer blades 470 for example.

Device 500 include left and right blade members 504L and 504R that include respective front surfaces 510L, 510R, respective confronting edges 520L and 520R, and respective aligned semicircular cutting portions 524L and 524R. In an example, left and right blade members 504L and 504R are open and closed by the blade members rotating either away from one another or towards one another.

Left blade member 504L includes a fiber support feature 530L on front surface 510L. Fiber support feature 530L has a semicircular wall section 531L that defines a fiber guide 532L sized to accommodate fiber 10, and also includes a lower support ledge 533L that extends horizontally toward right blade member 504R and in an example reaches to front surface 510R. Lower support ledge supports fiber 10 when the fiber extends through the left and right blades 504L and 504R when the blades are open and prior to the fiber being cut.

Right blade surface 504R includes on its front surface 510R a wedge-shaped insertion member 540R that has its apex adjacent cutting portion 524R. Thus, the alignment structure 502 is defined by fiber guide 532L and insertion member 540R.

FIG. 9A shows device 500 in an open position while FIG. 9B closed position by bring the left and right blade members 504L and 504L toward one another until the left and right confronting edges make contact, with buffered fiber 10 operably arranged therein between left and right blade members. FIG. 8C shows the device in the closed position but without buffered fiber 10 arranged therein to show a circular opening 550 having a central axis A3.

In operation, with blade members 504L and 504R in the open position, buffered fiber 10 is inserted between the blade members the blades and generally within semicircular cutting portions 524L and 524R. As blade members 504L and 504R close, insertion member 540R urges (pushes) buffered fiber 10 into fiber guide 532L and keeps the fiber from moving away from the semicircular cutting portions 524L and 524R. Insertion member 540R and fiber guide 532L act to squeeze buffered fiber 10 as blades 504L and 504R come together, thereby slightly compressing the fiber (e.g., by about 0.14 mm) as cutting portions 524L and 524R define a circumferential cut in the fiber. The slight compression ensures that buffered fiber 10 stays centered on axis A3 between semicircular cutting portions 524L and 524R as they cut into the fiber. This centering of buffered fiber 10 is important in cases where the cut is down to glass fiber 20, since the cutting portions 524L and 524R need to cut down to the glass fiber without actually cutting the glass fiber. Alignment structure 502 works for tight-buffered fibers 10 as well as loose-buffered (furcated) fibers.

Thus, an aspect of the disclosure is directed to a method of cutting buffered optical fiber 10. The method includes disposing buffered optical fiber 10 between the left and right (first and second) second aligned semicircular cutting portions 524L and 524R of first and second blade members 504L and 504R, with the first and second semicircular cutting portions defining circular opening 550 having the aforementioned central axis A3 when the first and second blade members are closed. The method also includes pushing buffered optical fiber 10 into fiber support feature 530L on left blade member 504L with insertion member 540R on left blade member 504R while closing first and second blade members to cause the buffered optical fiber to be centered on the central axis when the first and second blade members are closed.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of stripping a buffered fiber having an end, a central glass fiber, and a cover having a coating layer that surrounds the glass fiber and a buffer layer that surrounds the coating layer, comprising:
   a) making a first cut at a first position of the buffered fiber and down through the cover to the glass fiber to define a removable cover section;
   b) making a second cut at a second position of the buffered fiber between the first position and the fiber end, the second cut extending into the cover to about the coating layer; and
   c) sliding the removable cover section from the glass fiber to define an exposed glass fiber section.

2. The method according to claim 1, further including cutting the cover through the buffered fiber near the end to define a new end.

3. The method according to claim 1, wherein the first cut is a circumferential cut.

4. The method according to claim 1, wherein the second cut is an angled cut.

5. The method according to claim 1, wherein steps a) through c) are performed simultaneously.

6. The method according to claim 5, further comprising cutting through the buffered fiber near the end to define a new end, wherein said cutting through the buffered fiber is performed simultaneously with steps a) through c) of claim 1.

7. The method according to claim 1, wherein the second cut is a circumferential cut.

8. The method according to claim 7, further comprising:
   prior to performing the first cut, performing the second cut to define a first movable cover sub-section between the second position and the end, and to define a fixed cover section; and
   axially sliding the first movable cover sub-section away from the fixed cover section;
   wherein the first cut is performed in the fixed cover section after the second cut to define a second movable cover sub-section between the second position and first position, and further wherein the first and second movable cover sub-sections define the removable cover section that is slid from the glass fiber.

9. The method according to claim 8, wherein axially sliding the first movable cover sub-section away from the fixed cover section further comprises exposing a portion of the coating layer that defines a third movable cover sub-section between the first movable cover sub-section and the fixed cover section, and further wherein the first, second, and third movable cover sub-sections define the removable cover section.

10. The method according to claim 8, wherein the second cut also extends through the coating layer down to the glass fiber such that axially sliding the first movable cover sub-section away from the fixed cover section further comprises exposing a portion of the glass fiber between the first movable cover sub-section and the fixed cover section.

11. The method according to claim 1, wherein at least one of the cuts of the buffered optical fiber is performed by:
   disposing the buffered optical fiber between first and second aligned semicircular cutting portions of first and second blade members having respective first and second front surfaces and first and second confronting edges, with the first and second semicircular cutting portions defining a circular opening having a central axis when the first and second blade members are closed; and
   pushing the buffered optical fiber into a fiber support feature on the first blade member with an insertion member on the second blade member while closing the first and second blade members to cause the buffered optical fiber to be centered on the central axis when the first and second blade members are closed.

12. A method of stripping a buffered fiber having an end, a central glass fiber, and a cover having a coating layer that surrounds the glass fiber and a buffer layer that surrounds the coating layer, comprising:
   a) cutting through the buffered fiber at position P1 near the end to define a new end;
   b) circumferentially cutting the buffer layer and the coating layer down to the glass fiber at a point P3 a distance L20 away from position P1, thereby defining a removable cover section;
   c) making an angled cut in the buffer layer down to about the coating layer at a position P2 between positions P1 and P3 at a distance d2 from position P3; and
   d) removing the removable cover section by sliding the removable cover section off of the glass fiber to define an exposed glass fiber section having length L20 that is between 35 mm and 45 mm.

13. The method of claim 12, wherein acts a) through c) are performed simultaneously.

* * * * *